J. P. NIKONOW.
GEAR SHIFTING MECHANISM.
APPLICATION FILED MAR. 16, 1915.

1,228,812.

Patented June 5, 1917
3 SHEETS—SHEET 1.

WITNESSES:

INVENTOR
John P. Nikonow
BY
ATTORNEY

UNITED STATES PATENT OFFICE.

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,228,812.

Specification of Letters Patent.

Patented June 5, 1917.

Application filed March 16, 1915. Serial No. 14,775.

*To all whom it may concern:*

Be it known that I, JOHN P. NIKONOW, a subject of the Czar of Russia, and a resident of Wilkinsburg, in the county of Allegheny and State of Pennsylvania, have invented a new and useful Improvement in Gear-Shifting Mechanism, of which the following is a specification.

My invention relates to gear-shifting mechanisms and particularly to such mechanisms as are actuated by electromagnets to selectively control the shiftable gear wheels of the transmission mechanisms of automobiles or other motor vehicles.

My invention has for its object to provide a mechanism of the character indicated above which embodies a simple and efficient means whereby electromagnets are employed to store energy in springs for actuating the shiftable members to adjust the transmission mechanism for the several speed ratios.

In the operation of gear-shifting mechanisms, it is desirable that the meshing of the several coacting gear wheels be effected quickly and forcibly. It has been proposed, heretofore, to employ separate power devices to actuate gear-shifting mechanisms. Such devices, however, add materially to the weight and to the cost of the mechanism. The inertia of a number of rapidly moving parts causes a considerable shock in the operation of the device.

I provide a simple arrangement whereby the several electromagnets that are employed in some forms of gear-shifting mechanisms to actuate the shift rods may be selectively controlled to compress springs for effecting the adjustments for different speed ratios. The springs are released by the actuation of the usual clutch pedal to disengage the transmission clutch. This arrangement provides that the movable gear wheels of the transmission mechanism may be shifted only when the clutch is disengaged.

Figure 1:
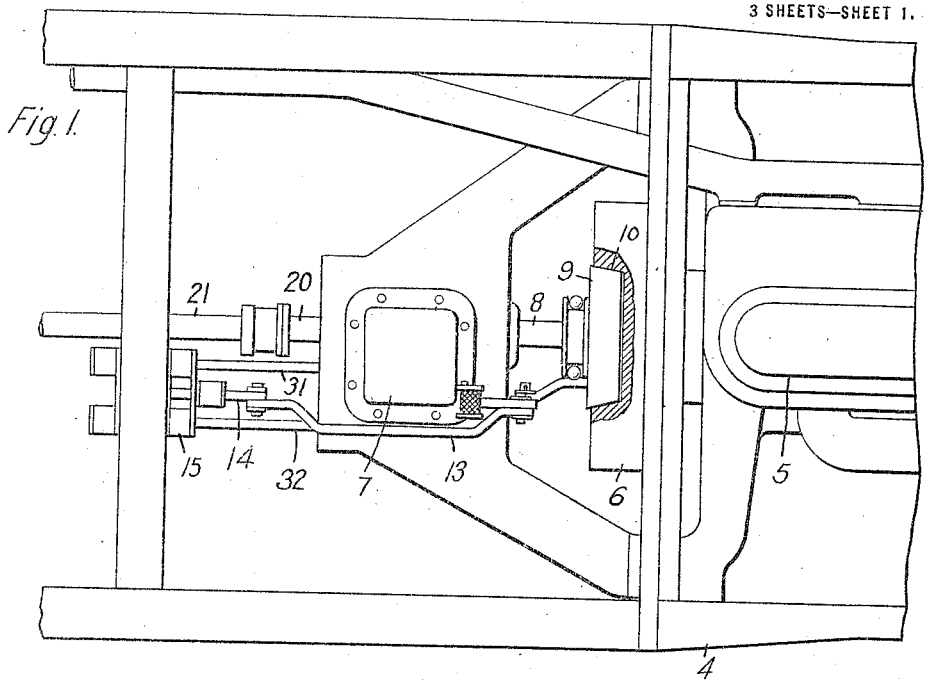
Figure 2:
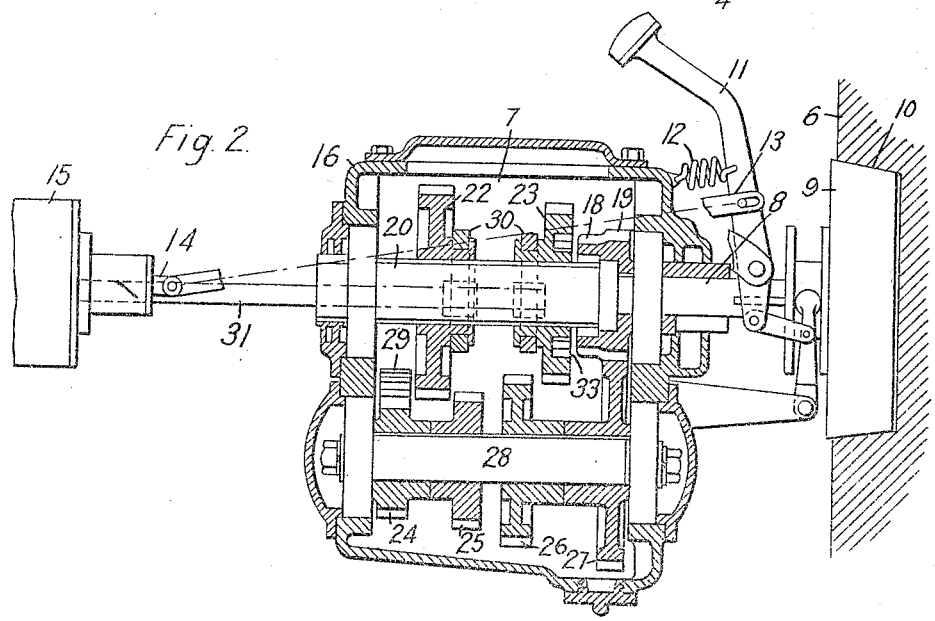
Figure 3:
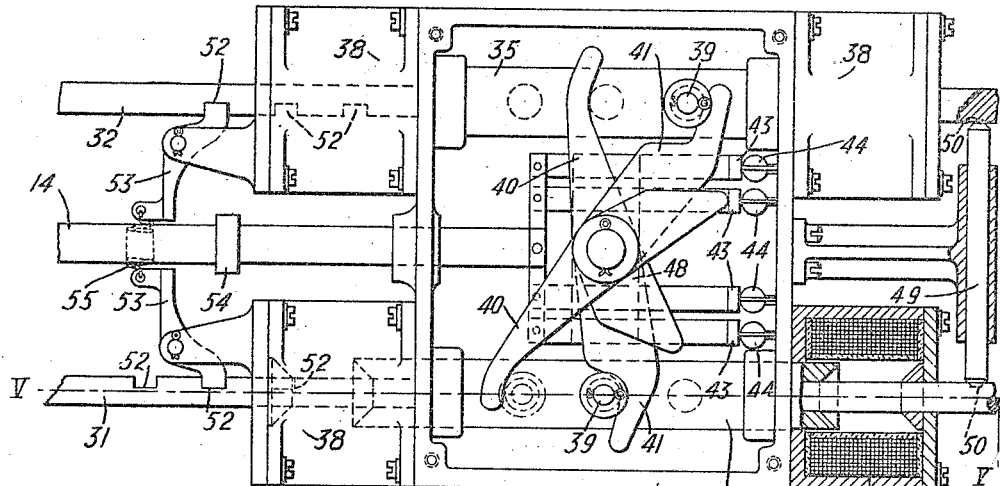
Figure 4:
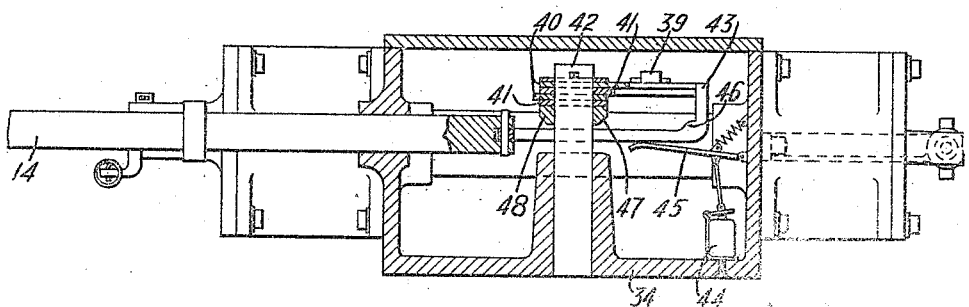
Figure 5:
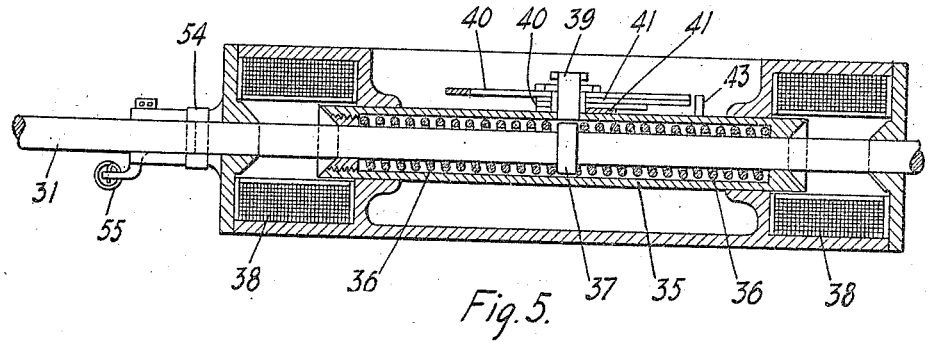
Figure 6:
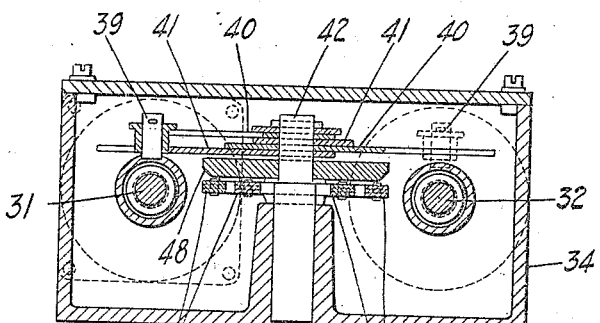
Figure 7:
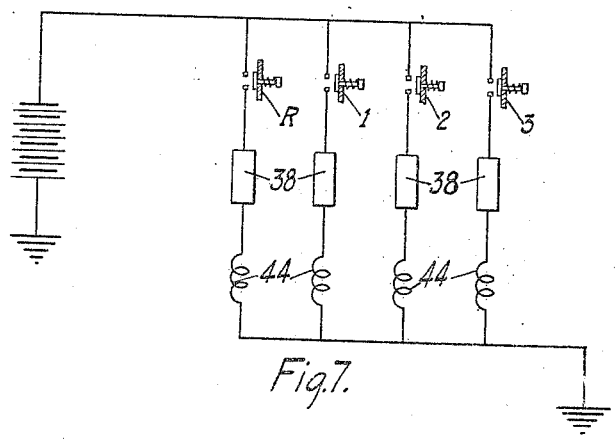

In the accompanying drawings, Figure 1 is a view, partially in plan and partially in section, of a portion of an automobile, with my invention applied thereto. Fig. 2 is a view, partially in elevation and partially in section, of a transmission mechanism of an automobile and its related parts. Fig. 3 is a view, partially in plan and partially in section, of the gear-shifting mechanism. Fig. 4 is a view, in longitudinal section, of the mechanism of Fig. 3. Fig. 5 is a view, in section, on line V—V of Fig. 3. Fig. 6 is a view, in transverse section, of the mechanism of Fig. 3. Fig. 7 is a diagrammatic view of the circuits and apparatus employed in connection with my invention.

Referring particularly to Figs. 1 and 2, an automobile chassis 4, only a portion of which is shown, is provided with a gas engine 5 having a fly wheel 6. A transmission mechanism 7, or a change-speed gear mechanism, is connected to the engine 5 by a shaft 8 and a conical clutch member 9 that is slidably mounted on the shaft 8 to coact with a correspondingly shaped clutch member 10 formed in the fly wheel 6. The clutch member 9 is controlled by the usual clutch pedal lever 11. A spring 12, that is attached at one end to a suitable stationary part, normally retains the clutch lever 11 in its rearward position, with the clutch member 9 engaging the clutch member 10. The lever 11 has a lost-motion connection to a link 13 which connects it to a rod 14 of a gear-shifting mechanism indicated at 15.

The transmission mechanism 7 forms no part of my invention but is so combined therewith that a description thereof is desirable in order to explain the operation of the gear-shifting mechanism. The shaft 8, which is connected to the clutch member 9, extends into the transmission casing 16. A gear wheel 17, having two sets of gear teeth 18 and 19, is mounted upon the shaft within the casing 16. A transmission shaft 20, which is connected to the main transmission shaft 21, is in axial alinement with the shaft 8.

The shaft 20 is adapted to be connected to the shaft 8, at different speed ratios, by means of two gear wheels 22 and 23 that are slidably keyed on the shaft 20, gear wheels 24, 25, 26 and 27 that are fixed upon a counter shaft 28 and an idler gear wheel 29 that is always in mesh with the gear wheel 24. The gear wheel 27 is always in mesh with the gear wheel 17 to connect the shafts 8 and 28. The mechanism is arranged to provide three speeds in the forward, and one in the reverse, direction. The changes in speed ratio are controlled by the slidable gear wheels 22 and 23 which are actuated by yoke members 30. The yoke members 30 are respectively connected to the shift rods 31 and 32 of the gear-shifting mechanism.

When the gear wheel 22 is in mesh with the gear wheel 25, the mechanism is in its first or low-speed position, and the shaft 8 is connected, through the gear teeth 19, gear wheel 27, counter shaft 28 and gear wheels 25 and 22, to the transmission shaft 20. For the second, or intermediate, speed, the gear wheel 23 is shifted into mesh with the gear wheel 26. For the third, or high, speed, the gear wheel 23 is shifted to the right until internal gear teeth 33, with which the gear wheel 23 is provided, mesh with the gear wheel 17. The shaft 5 is then directly connected to the transmission shaft 20, and the latter is driven at engine speed. For driving in the reverse direction, the gear wheel 22 is shifted into mesh with the idler gear wheel 29. The transmission mechanism is illustrated in its neutral or inoperative position in which the shaft 20 is not connected to the counter shaft 28.

Referring now to Figs. 3, 4, 5 and 6, the gear-shifting mechanism comprises a housing or casing 34 of substantially rectangular shape. Two shift rods 31 and 32 are slidably mounted in the end walls of the casing and project therethrough. Each of the shift rods is surrounded by a sleeve member 35 that is slidably mounted thereon. As shown in Fig. 5, in connection with the shift rod 31, two helical springs 36, which surround each of the shift rods, are inclosed by sleeve members 35. The springs 36 bear, at their outer ends, against the outer ends of the corresponding sleeve members 35 and, at their inner ends, against a collar member 37 that is fixed on the shift rod. The sleeve members 35 constitute the movable core members for pairs of electromagnets 38 that are mounted on the end walls of the casing 34 in axial alinement with the shift rods 31 and 32.

Each of the sleeve members 35 is provided, at substantially its mid portion, with a pin 39 that is adapted, when the core member is shifted in either direction, to engage one member of two corresponding pairs of levers 40 and 41 that are pivoted on a stationary pin 42. The core members are returned to their neutral positions by a mechanism comprising the pedal lever 11, the rod 14, the four hook members 43 that are arranged to coact with the corresponding levers 40 and 41. Each of the members 43 is controlled, as to its relative vertical position, by an auxiliary electromagnet 44 and a pivotally mounted lever 45 that is controlled by the electromagnet. Normally, the lever 45 is resiliently pressed upwardly against the member 43 and is drawn downwardly when the electromagnet 44 is energized. Each of the members 43 is actuated downwardly when an inclined portion 46 engages a cam surface 47 of a member 48 that is mounted on the pin 42.

Simultaneous movements of the shift rods 31 and 32 are prevented by an interlocking mechanism comprising a rod 49 and notches 50 in the shift rods 31 and 32, respectively, that are in alinement with the rod 49 when the corresponding shift rod is in its neutral position. The rod 49 is of such a length that both of the shift rods cannot be out of their neutral positions at the same time. The shift rods 31 and 32 are provided, also, with a series of notches 52 to be engaged by a latching mechanism comprising levers 53 that are controlled by a collar member 54 on the shaft 14. The levers 53 are yieldingly held in engagement with the several notches by a spring 55.

The electrical circuits that are employed to control the gear-shifting mechanism are illustrated in Fig. 7. Four circuits are connected in parallel relation to a storage battery and are controlled by a set of push buttons that may be located upon the steering wheel or at any other suitable place. The push buttons, which are illustrated diagrammatically, may be of any desired form or have any desired relation, the one with the other, for controlling the gear-shifting mechanism. The push buttons are designated R (reverse) and 1, 2 and 3, according to the respective speed ratios controlled by them. Each of the parallel circuits comprises one of the push buttons, an electromagnet 38 and an electromagnet 44. The electromagnets are so arranged that the actuation of one of the several push buttons will energize the proper electromagnets for producing the desired speed change and for preventing interference with such change by the levers 40 and 41 and the hook members 43.

It will be understood that, when one of the shift rods is actuated in either direction from a neutral position, one of the four levers 40 and 41 is engaged by the pin 39 that is shifted. The lever is accordingly shifted to such position that it is engaged by the corresponding hook member 43 to return the shifted mechanism to its neutral position upon a subsequent change in the speed ratio. When a push-button circuit is closed to select a speed ratio, the magnet for controlling the hook member 43 corresponding to the lever 40 or 41, as the case may be, that is to be shifted by the pin 39, is energized in order that the lever may move freely to its shifted position. The remaining hook members 43 are in position to engage the corresponding levers 40 and 41 to insure that any gear wheel previously shifted from its neutral position will be returned to that position.

It may be assumed that the transmission gear mechanism is in its neutral position, as illustrated in Fig. 2, and that the gear-shifting mechanism is in its corresponding normal or neutral position. It may be assumed further that the engine has been started and that the engine clutch members are engaged. Since it is desirable to start the vehicle on first speed, the push button designated by 1 is pressed to complete a circuit from the battery through the push button 1, corresponding electromagnets 38 and 44, to ground, and thence to the battery. The sleeve member 35 which surrounds the shift rod 31 is then actuated to the left, as viewed in Figs. 3 and 5, to compress one of the springs 36. The electromagnet 44, which controls the second hook member 43 from the top, as viewed in Fig. 3, is also energized to release the hook member.

The pedal lever 11, which, at the time of starting the engine, is in such a position that the clutch members 9 and 10 are in engagement, is then pressed forwardly beyond the clutch-disengaging position to cause the collar member 54 to disengage the levers 53 from the notches 52 in the respective shift rods. The shift rod 31 will then be actuated to the left by the spring 36 that was compressed by the sleeve member 35. The gear wheel 22, which is connected to the shift rod 31, is thereby shifted into mesh with the gear wheel 25. When the gear wheels 22 and 25 are fully meshed, the pin 39 on the shifted core member 35 occupies the position indicated by dotted lines in Fig. 3.

The operator then allows the spring 12 to return the clutch pedal 11 and thereby permit the levers 53 to engage the notches 52 with which they respectively register. The shift rod 31 is thus locked in its shifted position and cannot be returned to its neutral position until the clutch pedal has again been actuated to release the latching mechanism. Further return movement of the pedal lever will effect engagement of the engine clutch, and the vehicle will be driven through the connections above described.

When it is desired to change the speed ratio, as, for example, to second speed, the push button designated by 2 may be pressed at any time desired in advance of the actual change. The electromagnets 38 and 44 will be energized in the manner above described in connection with the push button 1 to respectively compress the corresponding spring 36 on the lift rod 32 and to release the upper hook member 43, Fig. 3. To effect the change to the desired speed, the operator presses the pedal lever 11 to disengage the engine clutch.

The rod 31 and the corresponding core member 35 are in their shifted positions, with the pin 39 in engagement with the corresponding lever 40. The corresponding hook member 43 is in a position to engage the said lever 40 upon a slight movement of the pedal lever 11 and the rod 14. A further actuation of the lever 11, after the clutch is out, operates to shift the lever 40 and the core member 35 to their respective neutral positions, thereby compressing the other of the springs 36 on the shift rod 31. The further movement of the lever 11 and the rod 14 releases the latching mechanism, and the shift rod 31 is returned by the spring 36 to its neutral position to disengage the gear wheels 22 and 25.

The actuation of the push button 2 operates, as above noted, to energize its corresponding electromagnet 38, and the core member 35 surrounding the shift rod 32 is shifted in a manner similar to that described in connection with the shift rod 31. Accordingly, when the shift rod 31 returns to its normal position and the interlocking mechanism is released, the shift rod 32 is actuated to the right, as viewed in Fig. 3, to shift the gear wheel 23 into mesh with the gear wheel 26. The return movement of the lever 11 by the spring 12 effects engagement of the engine clutch, and the vehicle is then driven at second speed.

In the same manner, changes may be made to third speed or the direction of drive reversed by actuating the appropriate push buttons. It will, of course, be understood that, in order to reverse the direction of the vehicle, it is necessary to bring it to a stop before the clutch is engaged.

When it is desired to return either of the shiftable gear wheels 22 and 23 to a neutral position, the clutch pedal lever 11 is actuated forwardly. The clutch is disengaged as above described, whereupon the rod 14 and the members 43 are actuated to the left (Fig. 3). Each of the members 43 is in a position to immediately engage its corresponding lever 40 or 41, as the case may be, if it has been shifted from its neutral position. The core member 35 that corresponds to the shifted rod 31 or 32, as the case may be, will then be returned to its neutral position, and the rod will be returned to its neutral position by the corresponding spring 36 when the latching mechanism is released at the end of the path of movement of the pedal lever 11.

Upon the return of the lever 11 to its normal or neutral position, the shift rods will be locked in their respective positions by the latching mechanism. It will then be impossible to shift the gear wheels until one of the buttons is operated to energize one of the electromagnets 38 to compress one of the springs 36.

It will be noted that I provide a mechanism by means of which the shifted gear wheels may be returned to neutral positions and the transmission mechanism adjusted for a different speed ratio by a continuous movement of a single actuating member. The main electromagnets that are employed may be of a slow-acting type and accordingly require only a small current. The action of the mechanism is always positive and quick.

I claim as my invention:

1. In a gear-shifting mechanism, the combination with a shiftable member, and a normally unstressed spring for shifting said member from a neutral position, of a magnet for supplying energy to said spring, and means for controlling the shifting of said member.

2. In a gear-shifting mechanism, the combination with a shiftable member, and normally unstressed spring means for actuating said member in opposite directions from a neutral position, of electromagnetic means for supplying energy to said spring means, and means for selectively controlling said electromagnetic means.

3. In a gear-shifting mechanism, the combination with a shiftable member, and normally unstressed resilient means for actuating said member in opposite directions from a neutral position, of means for supplying energy to said resilient means, and means for selectively controlling the actuation of said member and the operation of said energy-supplying means.

4. In a gear-shifting mechanism, the comtbination with a rod shiftable in opposite directions from a neutral position, a plurality of electromagnets, and a core member actuated in opposite directions by said electromagnets, of resilient means for connecting said core member to said shift rod, and means for selectively energizing said electromagnets to supply energy to said resilient means.

5. In a gear-shifting mechanism, the combination with a shift rod, a plurality of electromagnets, a core member therefor, and resilient means for connecting said core member to said rod, of means for selectively controlling said electromagnets to energize said resilient means.

6. In a gear-shifting mechanism, the combination with a shiftable gear wheel and a shift rod connected thereto, of resilient means for actuating said rod to an operative position, electromagnetic means for placing said resilient means under stress, means for locking said rod in a plurality of positions and a clutch lever mechanically connected to said locking means.

7. In a gear-shifting mechanism, the combination with a shiftable gear wheel, a shift rod connected thereto, a pair of electromagnets, a common core member therefor, and resilient means for connecting said core member to said rod, of means for selectively controlling said electromagnets to actuate said core member in opposite directions.

8. In a gear-shifting mechanism, the combination with a shiftable member, actuating springs for shifting said member in opposite directions from a neutral position, and electro-responsive means for supplying energy to said springs, of means for locking the shiftable member in a plurality of positions, and a clutch pedal lever for controlling said locking means.

9. In a gear-shifting mechanism, the combination with a shift rod, and spring means for actuating said rod in opposite directions from a neutral position, of electromagnetic means for supplying energy to said spring means, means for selectively controlling said electromagnetic means, means for locking said rod in a plurality of operative positions, and a clutch lever for controlling said locking means.

10. In a gear-shifting mechanism, the combination with a rod shiftable in opposite directions from a neutral position, a core member resiliently connected thereto, electromagnetic means for actuating said core member in opposite directions from a neutral position, and means for selectively controlling said electromagnetic means, of a clutch lever for controlling said rod and for returning said core member to its neutral position.

In testimony whereof, I have hereunto subscribed my name this 26th day of Feb. 1915.

JOHN P NIKONOW.

Witnesses:
W. A. DICK,
B. B. HINES.